(12) United States Patent
Ezawa et al.

(10) Patent No.: US 6,242,522 B1
(45) Date of Patent: Jun. 5, 2001

(54) RUBBER COMPOSITION FOR TIRE TREAD AND PNEUMATIC TIRE USING SAME

(75) Inventors: Naofumi Ezawa, Tokyo; Kazuo Yagawa, Saitama-ken; Naohiro Sasaka, Tokyo, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/274,012

(22) Filed: Mar. 22, 1999

(30) Foreign Application Priority Data

Mar. 24, 1998 (JP) .................................................. 10-075583
Jun. 26, 1998 (JP) .................................................. 10-180995

(51) Int. Cl.⁷ ................................ C08J 3/00; C08K 3/10; C08K 3/34; C08L 9/00; B60C 5/00
(52) U.S. Cl. ........................ 524/437; 152/151; 152/450; 152/905; 524/492; 524/493; 524/495; 524/496; 524/575
(58) Field of Search ..................................... 524/437, 492, 524/493, 575, 495, 496; 152/151, 450, 905

(56) References Cited

FOREIGN PATENT DOCUMENTS

| 0 697 432 | 2/1996 | (EP) . |
| 0 864 604 | 9/1998 | (EP) . |
| 2 110 151 | 5/1972 | (FR) . |

OTHER PUBLICATIONS

JP 09 136999 A, abstract, Central Patents Index, Basic Abstracts Journal, Week 3197, XP 002108664, May 27, 1997.

*Primary Examiner*—Patrick D. Niland
(74) *Attorney, Agent, or Firm*—Sughrue, Mion, Zinn, Macpeak & Seas, PLLC

(57) ABSTRACT

There is disclosed a rubber composition for a tire tread Which comprises 100 parts by weight of (A) a rubber component comprising a diene-based synthetic rubber or a mixture of a diene-based synthetic rubber and natural rubber and containing at least 20% by weight of a styrene-butadiene rubber; 5 to 50 parts by weight of (B) aluminum hydroxide powders; and at least 5 parts by weight of (C) silica powders, wherein the total amount of the components (B) and (C) is in the range of 40 to 80 parts by weight; and optionally chemical agents such as vulcanizing agents, vulcanization accelerators and antioxidants, and also is disclosed a pneumatic tire in which the above rubber composition is used as the tread rubber. The above rubber composition, when made into a tire tread, can maintain favorable low fuel consumption properties and low wear resistance, and besides can impart the tire with greatly improved gripping properties on wet road surfaces particularly at a low temperature. Moreover, the pneumatic tire made from the above rubber composition can exert excellent effect of maintaining a high maneuverability from the initial stage of running to and after the middle stage thereof.

10 Claims, No Drawings

RUBBER COMPOSITION FOR TIRE TREAD AND PNEUMATIC TIRE USING SAME

BACKGROUND OF THE INVENTION

1. Field of the Invention

The present invention relates to a rubber composition for tire treads and a pneumatic tire using the aforesaid rubber composition. More particularly, the present invention pertains to a rubber composition for tire treads which maintains low fuel consumption properties and which is greatly improved in gripping properties particularly on wet road surfaces at a low temperature, and to a pneumatic tire using the aforesaid rubber composition in tread rubber.

2. Description of the Related Arts

Carbon black has heretofore been prevailingly employed as a rubber-reinforcing filler. The reason for the foregoing is that carbon black is capable of imparting a rubber composition with high reinforcing properties and excellent wear resistance as compared with other fillers.

On the one hand, with the social demands for energy saving in recent years, an attempt is made to achieve low heat-buildup of a rubber composition for a tire, that is, low rolling- resistance of the tire for the purpose of saving fuel consumption of automobiles. In this case, consideration is given to decrease in the compounding amount of carbon black or to the use of carbon black having large particle sizes. However, it is known that any one of these methods that are taken into consideration can not escape from the deterioration of reinforcing properties, wear resistance and gripping properties on wet road surfaces.

On the other hand, there is known a silica hydride (wet silica) as a filler which reconciles low heat build-up properties and reinforcing properties, wear resistance or gripping properties on wet road surfaces when used in a rubber composition for a tire. Thus a number of applications for patents on the invention relating to the silica hydride have been filed with the Japanese Patent Office, including, for example, Japanese Patent Application Laid-Open Nos. 252431/1991 (Hei-3), 248116/1994 (Hei-6), 70369/1995 (Hei-7) 188466/1995 (Hei-7), 196850/1995 (Hei-7), 225684/1996 (Hei-8), 245838/1996 (Hei-8), 337687/1996 (Hei-8), etc.

However, a rubber composition which is compounded with silica hydride suffers from a disadvantage of inferior kinetic performance on dry road, because said composition has a low storage modulus, as compared with a rubber composition compounded with carbon black having a specific surface area similar to that of the silica hydride.

There are known, as a method for enhancing the aforestated storage modulus, a means in which the filling amount of the silica hydride is increased, a means in which the specific surface area of the silica hydride is increased, and the like. Nevertheless, any of the above-mentioned means involves a problem of deteriorating the low heat build-up property which is the characteristic of the silica hydride.

There is known, as a method for improving the gripping properties on wet road surfaces, a means in which the glass transition temperature of the rubber component is raised, that is, the hysteresis loss (tan δ) at 0° C. is increased. However there arises a problem that as the glass transition temperature of the rubber component is raised, the performance of the rubber composition at a low temperature is deteriorated and as a result, the rolling resistance of the tire containing the the rubber composition is unfavorably increased, thereby worsening the low fuel consumption properties.

In order to solve the above-mentioned problems, there have heretofore been disclosed a variety of techniques such as (1) a rubber composition suitable for a tire tread, which has improved gripping properties on wet road surfaces by incorporating a special silica and milling contrivance (European Patent No. 501227), (2) a rubber composition suitable for a tire tread, which has improved wet skid performance without deteriorating its processability or wear resistance, while preserving its low heat-buildup properties {Japanese Patent Application Laid-Open No.149950/1995 (Hei-7)} , (3) a rubber composition suitable for a tire tread, which has improved workability and gripping properties on wet or semi-wet road surfaces in the regions of low temperature and high temperature {Japanese Patent Application Laid-Open No.59893/1996 (Hei-8)}, (4) a rubber composition suitable for a tire tread, which has improved gripping properties on wet or semi-wet road surfaces in the regions of low temperature and high temperature without impairing its wear resistance {Japanese Patent Application Laid-Open No. 59894/1996 (Hei-8)}, and the like.

Nevertheless, the rubber composition (1) involves a problem in workability (processability) , the rubber composition (2) can not be said to have sufficient wear resistance, and the rubber compositions (3) and (4) involve the problem of requiring a large amount of reinforcing filler and the problem of being inferior in low heat-buildup properties.

On the one hand, there is known that aluminum hydroxide as a reinforcing filler for rubber, although being inferior to carbon black and the like with regard to reinforcing effect, imparts a rubber composition with low fuel consumption properties and favorable gripping properties on wet road surfaces.

With the recent steady trends towards high horsepower, high functionalization and prolonged service life of an automobile, a tire therefor is intensely required which is excellent in maneuverability from the initial stage to and after the middle stage of running. With regard to a passenger automobile in particular, the bias tire has been replaced with a radial tire, and such radial tire is required to have highly excellent maneuverability, accompanying the alteration of the rate of aspect ratio from 82 to 70, further from 70 to 65.

As one of the means for solving the aforestated problems, investigations are being made on a variety of compounding ingredients for rubber to be employed in a tire tread. When attention is paid to a vulcanization accelerator, there is disclosed in Japanese Patent Application Laid-Open No. 87138/1983 (Sho-58) that a rubber composition which is compounded with a specific vulcanization accelerator and a specific antioxidant, improves its resistant to heat cure and also the external appearance thereof at the last stage of running of a tire, but nothing is investigated at all therein on the kinetic performance of the tire. In addition, there is disclosed in Japanese Patent Application Laid-Open No. 139542/1981 (Sho-56) that a rubber composition which is compounded with a specific vulcanization accelerator, improves its burning (scorching) at the time of rubber milling, but nothing is described or suggested at all therein on the performance of a tire. When attention is paid to an inorganic filler, there is disclosed in Japanese Patent Application Laid-Open No. 53003/1998 (Hei-10) that a rubber composition which is blended with alumina improves its maneuverability at the initial stage of running of a tire, but can not maintain the improved maneuverability to and after the middle stage thereof.

SUMMARY OF THE INVENTION

Under such circumstances, a general object of the present invention is to provide a rubber composition which is capable of preserving low fuel cost properties and favorable wear resistance when used in a tire tread, and greatly improving gripping properties on wet road surfaces particularly at a low temperature, and to provide a pneumatic tire which employs this rubber composition in its tread.

Another object of the present invention is to provide a pneumatic tire which is capable of maintaining highly excellent wet maneuvering-stability (maneuvering stability on wet road surfaces) from the initial stage of running of a tire to and after the middle stage thereof.

In view of the foregoing, intensive research and investigation were accumulated by the present inventors in order to develop a rubber composition which has favorable properties as described hereinbefore. As a result, it has been found that the above-described object can be achieved by the rubber composition which comprises a rubber component containing styrene-butadiene rubber at a certain proportion, aluminum hydroxide powders and silica powders and, as the case may be, carbon black at certain proportions, respectively. The present invention has been accomplished by the aforestated findings and information.

That is to say, the present invention provides a rubber composition for tire treads which comprises 100 parts by weight of (A) a rubber component comprising a diene-based synthetic rubber or a mixture of a diene-based synthetic rubber and natural rubber and containing at least 20% by weight of a styrene-butadiene rubber; 5 to 50 parts by weight of (B) aluminum hydroxide powders; and at least 5 parts by weight of (C) silica powders, wherein the total amount of the components (B) and (C) is in the range of 40 to 80 parts by weight.

The present invention also provides a pneumatic tire which employs the above-mentioned rubber composition as tread rubber.

DESCRIPTION OF THE PREFERRED EMBODIMENTS

There is used in the rubber composition according to the present invention, (A) a rubber component comprising a diene-based synthetic rubber or a mixture of a diene-based synthetic rubber and natural rubber. Examples of the diene-based synthetic rubber include synthetic polyisoprene rubber(IR), poly-butadiene rubber (BR), styrene-butadiene rubber (SBR), acrylo-nitrile-butadiene rubber(NBR), chloroprene rubber(CR) and butyl rubber(IIR). Any of the diene-based synthetic rubber may be used alone or in combination with at least one other. It is necessary to use the component (A) containing at least 20% by weight of styrene-butadiene rubber. The use of the component (A) containing less than 20% by weight of styrene-butadiene rubber remarkably deteriorates the workability of the rubber composition. The content of the styrene-butadiene rubber (SBR) in the component (A) is preferably at least 40% by weight, more preferably at least 70% by weight. The use of the component (A) containing less than 40% by weight of styrene-butadiene rubber (SBR) has a tendency to deteriorate the maneuverability of the tire and riding comfort characteristic. It is preferable to blend the styrene-butadiene rubber (SBR) so that the styrene content becomes at least 20% by weight, particularly in the range of 25% to 40% by weight based on the total rubber component (A). The styrene content, when being less than 20% by weight, is apt to deteriorate the wet skid performance of a tire, whereas the styrene content, when being more than 40% by weight, is prone to increase the rolling-resistance of a tire and at the same time, decrease the wear resistance thereof. The styrene content of at least 20% by weight based on the total rubber component as mentioned hereinbefore, means that, in the case where the component (A) consists of 50 parts by weight of SBR and 50 parts by weight of natural rubber as the other rubber component, the styrene content in the SBR is at least 40% by weight based on the SBR. Moreover, it is possible to use the styrene-butadiene rubber (SBR) which has been produced by any of polymerization process such as emulsion polymerization process and solution polymerization process.

There are preferably used aluminum hydroxide powders which have an average particle diameter of at most 10 $\mu$m as the component (B) of the rubber composition in the present invention. The average particle diameter thereof, when being larger than 10 $\mu$m, will result in failure to sufficiently exert the reinforcing effect, thereby deteriorating the wear resistance and the gripping properties on wet road surfaces (wet performance), whereas the average particle diameter thereof, when being unreasonably small, will bring about excessively strong agglomeration of the powders themselves and difficulty in favorable dispersion thereof in the rubber, thus failing to obtain a rubber composition having expected performances. The average particle diameter of the aluminum hydroxide powders is more preferably in the range of 0.1 to 10 $\mu$m, most preferably 0.1 to 8 $\mu$m from the viewpoint of the balance among reinforcing properties, gripping properties on wet road surfaces and low fuel consumption properties.

It is made possible to greatly enhance the wet performance without deteriorating the workability by blending the aluminum hydroxide powders described as the component (B) in the rubber composition. The aluminum hydroxide powders as the component (B) in the present invention may be used alone or in combination with at least one other. The amount of the component (B) to be contained in the rubber composition is in the range of 5 to 50 parts by weight based on 100 parts by weight of the rubber component as the component (A). The amount of the component (B), when being less than 5 parts by weight based thereon, brings about failure to sufficiently exert the effect on improving the wet performance, whereas said amount, when being more than 50 parts by weight based thereon, leads to relative decreases in the contents of silica powders or carbon black, thus markedly lowers the wear resistance. Taking into consideration the wet performance, wear resistance and the like factors, the amount of the component (B) to be contained therein is preferably in the range of 10 to 30 parts by weight.

Silica powders are used as the component (C) in the rubber composition according to the present invention. The object of using silica powders is to compensate for the reinforcing properties of the aluminum hydroxide powders as the component (B) which is devoid of sufficient reinforcing properties. It is made possible to lower the rolling resistance of the tire, bring about low fuel consumption properties of the tire, and impart proper hardness to the rubber composition without deteriorating the wet performance by blending silica powders as the component (C) in the rubber composition.

The silica powders to be blended as the component (C) are not specifically limited, but may be selected for use from the silica powders which have heretofore been customarily employed for the reinforcement of rubber, for instance, from silica produced by dry process and silica produced by wet process (silica hydride). Preferably, the silica powders have a nitrogen adsorption specific surface area (BET) in the range of 50 to 300 m²/g taking into consideration the wear resistance, low fuel consumption properties and the like factors. The above-mentioned BET value is determined according to ASTM D 4820-93 after being dried at 300° C. for one hour.

The silica powders as the component (C) in the present invention may be used alone or in combination with at least one other. The necessary amount of the component (C) to be contained in the rubber composition is at least 5 parts by weight based on 100 parts by weight of the rubber component as the component (A). The amount of the component (C), when being less than 5 parts by weight based thereon, brings about failure to sufficiently exert the effect on reinforcing the rubber composition and lowering the rolling resistance.

It is possible in the rubber composition according to the present invention to blend, when desired, carbon black as the component (D) by combining it with the silica powders as the component (C) or by replacing part of the silica powders (C) with carbon black (D) for the purpose of enhancing the reinforcing properties, wear resistance, etc. of the rubber composition. The carbon black to be blended is classified into channel black, furnace black, acetylene black, thermal black, etc. according to the production process, any and all of which are usable in the rubber composition. It is preferable that the carbon black have a nitrogen adsorption specific surface area (BET) of at least 90 $m^2/g$ and also a dibutyl phthalate absorption amount (DBP) of at least 50 ml/10 g taking the working effect into consideration. The DBP of carbon black is more preferably at least 100 ml/100 g. In the case where the BET value is less than 90 $m^2/g$, or the DBP value is less than 50 ml/100 g, it is made difficult to attain sufficient reinforcing properties or wear resistance of the rubber composition. On the other hand, when the BET value or the DBP value is unreasonably high, it gives rise to the deterioration of low fuel consumption properties. It is more preferable that the carbon black have a BET value in the range of 90 to 300 $m^2/g$ and also a DBP value in the range of 100 to 200 ml/100 g taking into consideration reinforcing properties and wear resistance of the rubber composition, and low fuel consumption properties. The above-mentioned BET value and DBP value are determined according to ASTM D 3037-88 and JIS K 6221-1982 (Method A), respectively.

The carbon black as the component (D) in the present invention may be used alone or in combination with at least one other. The necessary amount of the component (D) to be contained in the rubber composition is preferably at least one part, more preferably 1 to 70 parts, most preferably 5 to 65 parts by weight based on 100 parts by weight of the rubber component as the component (A). In addition, the total amount of the components (B), (C) and (D) is set to 40 to 80 parts by weight based on 100 parts by weight of the component (A). The amount of the component (D), when being unreasonably large, gives rise to relative decreases in the contents of the aluminum hydroxide powders and silica powders, thereby deteriorating the wet performance and low fuel consumption properties. The amount of the component (D), when being less than one part by weight based thereon, renders the carbon black blending meaningless from the aspects of reinforcing properties and wear resistance.

It is necessary that the total amount of the components (B) and (C), or the total amount of the components (B), (C) and (D) when blended be in the range of 40 to 80 parts by weight based on 100 parts by weight of the rubber component (A). The total amount thereof, when being less than 40 parts by weight based thereon, results in failure to achieve sufficient reinforcing effect, whereas the total amount thereof, when being more than 80 parts by weight based thereon, also results in failure to achieve the rubber composition having expected desirable properties. In view of the blending effect of the components, physical properties of the rubber composition and the like factors, the total amount of the components (B) and (C), or the total amount of the components (B), (C) and (D) is in the range of preferably 50 to 80 parts by weight based thereon.

It is possible in the rubber composition according to the present invention to blend, when desired, a coupling agent as the component (E) for the purpose of improving the dispersibility into the matrix rubber, of the aluminum hydroxide powders as the component (B) and the silica powders as the component (C), thereby enhancing the reinforcing properties. The coupling agent as the component (E) to be blended is not specifically limited, but may be selected for use from a variety of previously well known coupling agents, of which a silane-based coupling agent is suitable.

Examples of the silane-based coupling agents include sulfide base such as bis(3-trimethoxysilylpropyl) tetrasulfide; bis(3-triethoxysilylpropyl) tetrasulfide; bis(3-methyldimethoxysilylpropyl) tetrasulfide; bis(3-triethoxysilylethyl) tetrasulfide; bis(3-triethoxysilylpropyl) disulfide; bis(3-trimethoxysilylpropyl) disulfide; bis(3-triethoxysilylpropyl) trisulfide; 3-trimethoxysilylpropyl-N,N-dimethylcarbamoyl tetrasulfide; 3-trimethoxysilylpropylbenzothiazolyl tetrasulfide; and 3-trimethoxysilylpropylmethacryloyl monosulfide, mercapto base such as 3-mercaptopropyltrimethoxysilane; 3-mercaptopropyltriethoxysilane; and 3-mercaptopropylmethyldimethoxy silane, vinyl base such as vinyltriethoxysilane; and vinyltrimethoxysilane, amino base such as 3-aminopropyltriethoxysilane; and 3-aminopropyltrimethoxysilane, and glycidoxy base such as γ-glycidoxypropyltrimethoxysilane; and δ-glycidoxypropylmethyldiethoxysilane. Suitable silane-based coupling agents among the foregoing are those of sulfide base, mercapto base, and vinyl base.

The silane-based coupling agent as the component (E) in the rubber composition according to the present invention may be used alone or in combination with at least one other. The amount of the component (E) to be contained in the rubber composition is preferably 1 to 20% by weight, more preferably 2 to 15% by weight based on the total amount of the components (B) and (C) from the standpoints of working effect, economical efficiency, and the like.

In the case where the rubber composition according to the present invention contains, as a vulcanization accelerator(F), a specific dithiophosphoric acid compound-based vulcanization accelerator or a specific benzothiazole compound-based vulcanization accelerator in an amount of 0.2 to 10.0 parts by weight, it is made possible to obtain a pneumatic tire which maintains highly excellent maneuvering-stability from the initial stage of tire running to and after the middle stage thereof in addition to the above-mentioned working effects.

That is to say, the vulcanization accelerator (F) to be employed in the rubber composition according to the present invention preferably comprises a specific dithiophosphoric acid compound-based vulcanization accelerator or a specific benzothiazole compound-based vulcanization accelerator.

Preferably, the dithiophosphoric acid compound-based vulcanization accelerator to be used in the rubber composition according to the present invention is at least one member selected from the group consisting of a metallic salt of dithiophosphoric acid represented by the general formula (I), O, O'-dialkyl dithiophosphate disulfide and O, O'-dialkyl dithiophosphate tetrasulfide.

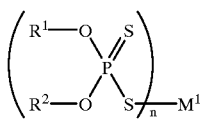
(I)

wherein $R^1$ and $R^2$ are independently an alkyl group which may be any of straight chain and branched chain and which has 1 to 8 carbon atoms, a cycloalkyl group having 3 to 10 carbon atoms, or an aryl group having 6 to 10 carbon atoms; $M^1$ is a metal atom selected from the group consistiing of Zn atom, Sb atom, Fe atom and Cu atom; and n is the number of valency of the matal bonded.

In the general formula (I) $R^1$ and $R^2$, which are as described above, are each preferably an alkyl group having 3 to 4. carbon atoms. A metallic salt of dithiophosphoric acid having an alkyl group with 2 or less carbon atoms is unfavorable because of its tendency to decrease in the miscibility with rubber, whereas said salt having an alkyl group with 5 or more carbon atoms fails to further exert a working effect, and hence is not necessarily effective from the economical point of view. Of the above-exemplified metal atoms, Zn atom and Sb atom are preferable. That is to say, a preferable metallic salt of dithiophosphoric acid is that represented by the general formula (II)-(1) or (II)-(2)

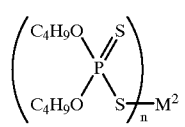
(II)-(1)

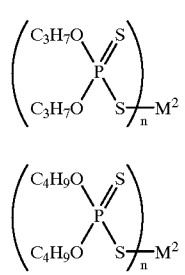
(II)-(2)

wherein $M^2$ is a metal atom selected from the group consisting of Zn atom and Sb atom; and n is the number of valency of the matal bonded.

Examples of the aforestated metallic salts of dithiophosphoric acid include zinc O,O'-dipropyl dithiophosphate; zinc O,O'-diisopropyl dithiophosphate; zinc O,O'-di-n-butyl dithiophosphate; zinc O,O'-di-sec-butyl dithiophosphate; zinc O,O'-di-tert-butyl dithiophosphate; zinc O,O'-diphenyl dithiophosphate; zinc O,O'-dicyclohexyl dithiophosphate; antimony O,O'-dipropyl dithiophosphate; antimony O,O'-diisopropyl dithiophosphate; antimony O,O'-di-n-butyl dithiophosphate; antimony O,O'-di-sec-butyl dithiophosphate; antimony O,O'-ditert-butyl dithiophosphate; antimony O,O'-diphenyl dithiophosphate; and antimony O,O'-dicyclohexyl dithiophosphate. Preferble metallic salts among them are zinc O,O'-diisopropyl dithiophosphate; zinc O,O'-di-n-butyl dithiophosphate; antimony O,O'-diisopropyl dithiophosphate; and antimony O,O'-di-n-butyl dithiophosphate. The above-mentioned vulcanization accelerator (F) may be used alone or in combination with at least one other.

Examples of the O,O'-dialkyl dithiophosphate disulfide and O,O'-dialkyl dithiophosphate tetrasulfide include O,O'-di-butyl dithiophosphate disulfide ; O,O'-diisopropyl dithiophosphate disultide; O,O'-dipropyl dithiophosphate disulfide; O,O'-diethyl dithiophosphate disulfide; O,O'-dimethyl dithiophosphate disulfide; O,O'-bis(2-ethylhexyl) dithiophosphate disulfide; O,O'-bis(4-methylpentyl) dithiophosphate disulfide; O,O'-dioctadecyl dithiophosphate disulfide; O,O'-di-butyl dithiophosphate tetrasulfide; O,O'-diisopropyl dithiophosphate tetrasulfide; O,O'-dipropyl dithiophosphate tetrasulfide; O,O'-diethyl dithiophosphate tetrasulfide; O,O'-dimethyl dithiophosphate tetrasulfide; O,O'-bis(2-ethylhexyl)dithiophosphate tetrasulfide; O,O'-bis(4-methylpentyl)dithiophosphate tetrasulfide; and O,O'-dioctadecyl dithiophosphate tetrasulfide. Of the above-exemplified species are preferable O,O'-dibutyl dithiophosphate tetrasulfide; O,O'-diisopropyl dithiophosphate tetrasulfide; and O,O'-bis(2-ethylhexyl)-dithiophosphate tetrasulfide from the aspect of the effects.

It is necessary that the above-mentioned dithiophosphoric acid compound-based vulcanization accelerator be contained in the rubber composition according to the present invention in an amount of 0.2 to 10.0 parts, preferably 0.5 to 5.0 parts by weight based on 100 parts by weight of the rubber component. The amount thereof, when being less than 0.2 part by weight based thereon, results in lowered effect on the enhancement of maneuverability after the tire running, whereas the amount thereof, when being more than 10 parts by weight based thereon, is not economically effective, since further working effect is hardly recognized.

It is preferable that the benzothiazole compound-based vulcanization accelerator to be used for maintaining the maneuvering stability of the tire comprise at least one member selected from the compounds represented by any of the general formulae (III), (IV), (V) and (VI).

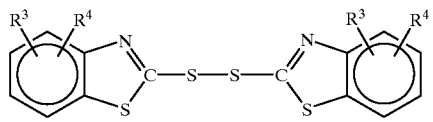
(III) - (1)

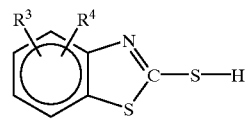
(III) - (2)

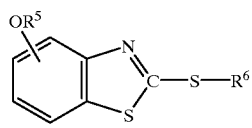
(IV)

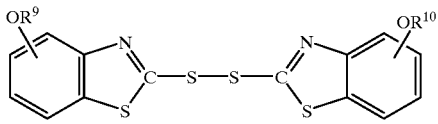
(V)

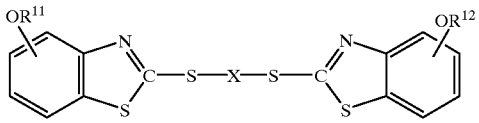
(VI)

wherein $R^3$ and $R^4$ are independently a hydrogen atom, an alkyl group having 1 to 8 carbon atoms or an aryl group having 6 to 10 carbon atoms with the proviso that $R^3$ and $R^4$ are not simultaneously a hydrogen atom; $R^5$ is an alkyl group having 1 to 8 carbon atoms, an alkenyl group having 2 to 8 carbon atoms or a cycloalkyl group having 3 to 8 carbon atoms; $R^6$ is a hydrogen atom or an amino group represented by —$N(R^7)R^8$ wherein $R^7$ and $R^8$ are independently a hydrogen atom, an alkyl group having 2 to 4 carbon atoms or a cyclohexyl group with the proviso that $R^7$ and $R^8$ are not simultaneously a hydrogen atom; $R^9$ and $R^{10}$ are independently an alkyl group having 1 to 8 carbon atoms, an alkenyl group having 2 to 8 carbon atoms or a cycloalkyl group having 3 to 8 carbon atoms ; X is Zn atom, Cu stom or an amino group represented by >N—$R^{13}$ wherein $R^{13}$ is an alkyl group having 2 to 4 carbon atoms or a cyclohexyl group; and $R^{11}$ and $R^{12}$ are each the same as $R^9$.

In the benzothiazole compound-based vulcanization accelerator represented by the general formula (III) to be used in the present invention, $R^3$ and $R^4$, which are independently a hydrogen atom, an alkyl group having 1 to 8 carbon atoms or an aryl group having 6 to 10 carbon atoms with the proviso that $R^3$ and $R^4$ are not simultaneously a hydrogen atom, are preferably a hydrogen atom, an alkyl group having 1 to 6 carbon atoms or an aryl group having 6 to 10 carbon atoms, more preferably a hydrogen atom, a methyl group, an ethyl group or a phenyl group.

Examples of the benzothiazole compound-based vulcanization accelerator represented by the general formula (III) include 2-mercapto-4-methylbenzothiazole; 2-mercapto-4-ethyl-benzothiazole; 2-mercapto-5-methylbenzothiazole; 2-mercapto-5-ethylbenzothiazole; 2-mercapto-6-methylbenzothiazole; 2-mercapto-6-ethylbenzothiazole; 2-mercapto -4,5-dimethylbenzothiazole; 2-mercapto-4,5-diethylbenzothiazole; 2-mercapto-4-phenylbenzothiazole; 2-mercapto-5-phenylbenzothiazole; 2-mercapto-6-phenylbenzothiazole; bis(4-methylbenzothiazolyl-2) disulfide; bis(4-ethylbenzothiazolyl-2) disulfide; bis(5-methylbenzothiazolyl-2) disulfide; bis(5-ethylbenzothiazolyl-2) disulfide; bis(6-methylbenzothiazolyl-2) disulfide; bis(6-ethylbenzothiazolyl-2) disulfide; bis(4,5-dimethylbenzothiazolyl-2) disulfide; bis(4,5-diethylbenzothiazolyl-2) disulfide; bis(4-phenylbenzothiazolyl-2) disulfide; bis(5-phenylbenzothiazolyl-2) disulfide; and bis(6-phenylbenzothiazolyl-2) disulfide. Of these are preferable bis(4-methyl-benzothiazolyl-2) disulfide; bis(5-methylbenzothiazolyl-2) disulfide; 2-mercapto-4-methylbenzothiazole; and 2-mercapto-5-methylbenzthiazole. The foregoing vulcanization accelerator may be used alone or in combination with at least one other.

The process for producing any of the vulcanization accelerators as mentioned hereinbefore is not specifically limited, and it is possible to easily produce the same, for instance, by the use of a production process disclosed in Japanese Patent Application Laid-Open No. 93361/1974 (Sho-49).

The benzothiazole compound-based vulcanization accelerator represented by any of the general formulae (IV), (V) and (VI) to be used in the present invention is an alkoxy group-containing 2-mercaptobenzothiazole compound, and may be used alone or in combination with at least one other.

In the formulae (IVN), (V) and (VI), $R^5$ is an alkyl group having 1 to 8 carbon atoms or an alkenyl group having 2 to 8 carbon atoms or a cycloalkyl group having 3 to 8 carbon atoms; $R^6$ is a hydrogen atom or an amino group represented by —$N(R^7)R^8$ wherein $R^7$ and $R^8$ are independently a hydrogen atom, an alkyl group having 2 to 4 carbon atoms or cyclohexyl group with the proviso that $R^7$ and $R^8$ are not simultaneously a hydrogen atom; $R^9$ and $R^{10}$ are independently an alkyl group having 1 to 8 carbon atoms, an alkenyl group having 2 to 8 carbon atoms or a cycloalkyl group having 3 to 8 carbon atoms; X is Zn atom, Cu atom or an amino group represented by >N—$R^{13}$ wherein $R^{13}$ is an alkyl group having 2 to 4 carbon atoms or a cyclohexyl group; and $R^{11}$ and $R^{12}$ are each same as $R^9$.

In the foregoing formulae, the alkoxy group represented by any of —$OR^5$, —$OR^9$, —$OR^{10}$, —$OR^{11}$ and —$OR^{12}$ is preferably independently a methoxy group, an ethoxy group or a butoxy group from the viewpoint of the working effect, more preferably an ethoxy group.

Examples of the benzothiazole compound-based vulcanization accelerator represented by the general formula (IV) include 4-methoxy-2-mercaptobenzothiazole; 5-methoxy-2-mercaptobenzothiazole; 6-methoxy-2-mercaptobenzothiazole; 7-methoxy-2-mercaptobenzothiazole; 4-ethoxy-2-mercaptobenzothiazole; 5-ethoxy-2-mercaptobenzothiazole; 6-ethoxy-2-mercaptobenzothiazole; 7-ethoxy-2-mercaptobenzothiazole; 4-butoxy-2-mercaptobenzothiazole; 5-butoxy-2-mercaptobenzothiazole; 6-butoxy-2-mercaptobenzothiazole; 7-butoxy-2-mercaptobenzothiazole; N-tert-butyl-4-methoxy-2-benzothiazolylsulfenamide; N-tert-butyl-5-methoxy-2-benzothiazolylsulfenamide; N-tert-butyl-6-methoxy-2-benzothiazolylsulfenamide; N-tert-butyl-7-methoxy-2-benzothiazolylsulfenamide; N-tert-butyl-4-ethoxy-2-benzothiazolylsulfenamide; N-tert-butyl-5-ethoxy-2-benzothiazolylsulfenamide; N-tert-butyl-6-ethoxy-2-benzothiazolylsulfenamide; N-tert-butyl-7-ethoxy-2-benzothiazolylsulfenamide; N-tert-butyl-4- butoxy-2-benzothiazolylsulfenamide; N-tert-butyl-5-butoxy-2-benzothiazolylsulfenamide; N-tert-butyl-6-butoxy-2-benzothiazolylsulfenamide; N-tert-butyl-7-butoxy-2-benzothiazolylsulfenamide; N-ethyl-4-methoxy-2-benzothiazolylsulfenamide; N-ethyl-5-methoxy-2-benzothiazolylsulfenamide; N-ethyl-6-methoxy-2-benzothiazolylsulfenamide; N-ethyl-7-methoxy-2-benzothiazolylsulfenamide; N-ethyl-4-ethoxy-2-benzothiazolylsulfenamide; N-ethyl-5-ethoxy-2-benzothiazolylsulfenamide; N-ethyl-6-ethoxy-2-benzothiazolylsulfenamide; N-ethyl-7-ethoxy-2-benzothiazolylsulfenamide; N-ethyl-4-butoxy-2-benzothiazolylsulfenamide; N-ethyl-5-butoxy-2-benzothiazolylsulfenamide; N-ethyl-6-butoxy-2-benzothiazolylsulfenamide; N-ethyl-7-butoxy-2-benzothiazolylsulfenamide; N-cyclohexyl-4-methoxy-2-benzothiazolylsulfenamide; N-cyclohexyl-5-methoxy-2-benzothiazolylsulfenamide; N-cyclohexyl-6-methoxy-2-benzothiazolylsulfenamide; N-cyclohexyl-7-methoxy-2-benzothiazolylsulfenamide; N-cyclohexyl-4-ethoxy-2-benzothiazolylsulfenamide; N-cyclohexyl-5-ethoxy-2-benzothiazolylsulfenamide; N-cyclohexyl-6-ethoxy-2-benzothiazolylsulfenamide; N-cyclohexyl-7-ethoxy-2-benzothiazolylsulfenamide; N-cyclohexyl-4-butoxy-2-benzothiazolylsulfenamide; N-cyclohexyl-5-butoxy-2-benzothiazolylsulfenamide; N-cyclohexyl-6-butoxy-2-benzothiazolylsulfenamide; N-cyclohexyl-7-butoxy-2-benzothiazolylsulfenamide; N,N-dicyclohexyl-4-methoxy-2-benzothiazolylsulfenamide; N,N-dicyclohexyl-5-methoxy-2-benzothiazolylsulfenamide; N,N-dicyclohexyl-6-methoxy-2-benzothiazolylsulfenamide; N,N-dicyclohexyl-7-methoxy-2-benzothiazolylsulfenamide; N,N-dicyclohexyl-4-ethoxy-2-benzothiazolylsulfenamide; N,N-dicyclohexyl-5-ethoxy-2-benzothiazolylsulfenamide; N,N-dicyclohexyl-6-ethoxy-2-benzothiazolylsulfenamide; N,N-dicyclohexyl-7-ethoxy-2-benzothiazolylsulfenamide;

N,N-dicyclohexyl-4-butoxy-2-benzothiazolylsulfenamide; N,N-dicyclohexyl-5-butoxy-2-benzothiazolylsulfenamide; N,N-dicyclohexyl-6-butoxy-2-benzothiazolylsulfenamide; and N,N-dicyclohexyl-7-butoxy-2-benzothiazolylsulfenamide.

Examples of the benzothiazole compound-based vulcanization accelerator represented by the general formula (V) include di-4-methoxy-2-benzothiazyl sulfide; di-5-methoxy-2-benzothiazyl sulfide; di-6-methoxy-2-benzothiazyl sulfide; di-7-methoxy-2-benzothiazyl sulfide; di-4-ethoxy-2-benzothiazyl sulfide; di-5-ethoxy-2-benzothiazyl sulfide; di-6-ethoxy-2-benzothiazyl sulfide; di-7-ethoxy-2-benzothiazyl sulfide; di-4-butoxy-2-benzothiazyl sulfide; di-5-butoxy-2-benzothiazyl sulfide; di-6-butoxy-2-benzothiazyl sulfide; and di-7-buthoxy-2-benzothiazoyl sulfide.

Examples of the benzothiazole compound-based vulcanization accelerator represented by the general formula (VI) include zinc salts of 4-methoxy-2-mercaptobenzothiazole; zinc salts of 5-methoxy-2-mercaptobenzothiazole; zinc salts of 6-methoxy-2-mercaptobenzothiazole; zinc salts of 7-methoxy-2-mercaptobenzothiazole; zinc salts of 4-ethoxy-2-mercaptobenzothiazole; zinc salts of 5-ethoxy-2-mercaptobenzothiazole; zinc salts of 6-ethoxy-2-mercaptobenzothiazole; zinc salts of 7-ethoxy-2-mercaptobenzothiazole; zinc salts of 4-butoxy-2-mercaptobenzothiazole; zinc salts of 5-butoxy-2-mercaptobenzothiazole; zinc salts of 6-butoxy-2-mercaptobenzothiazole; zinc salts of 7-butoxy-2-mercaptobenzothiazole; copper salts of 4-methoxy-2-mercaptobenzothiazole; copper salts of 5-methoxy-2-mercaptobenzothiazole; copper salts of 6-methoxy-2-mercaptobenzothiazole; copper salts of 7-methoxy-2-mercaptobenzothiazole; copper salts of 4-ethoxy-2-mercaptobenzothiazole; copper salts of 5-ethoxy-2-mercaptobenzothiazole; copper salts of 6-ethoxy-2-mercaptobenzothiazole; copper salts of 7-ethoxy-2-mercaptobenzothiazole; copper salts of 4-butoxy-2-mercaptobenzothiazole; copper salts of 5-butoxy-2-mercaptobenzothiazole; copper salts of 6-butoxy-2-mercaptobenzothiazole; copper salts of 7-butoxy-2-mercaptobenzothiazole ; N-ethyl-(4-methoxy-2-benzothiazolyl)sulfenimide; N-ethyl-(5-methoxy-2-benzothiazolyl)sulfenimide; N-ethyl-(6-methoxy-2-benzothiazolyl)sulfenimide; N-ethyl-(7-methoxy-2-benzothiazolyl)-sulfenimide; N-tert-butyl(4-methoxy-2-benzothiazolyl)sulfenimide; N-tert-butyl(5-methoxy-2-benzothiazolyl)sulfenimide; N-tert-butyl(6-methoxy-2-benzothiazolyl)sulfenimide; N-tert-butyl-(7-methoxy-2-benzothiazolyl)sulfenimide; N-cyclohexyl(4-methoxy-2-benzothiazolyl)sulfenimide; N- cyclohexyl(5-methoxy-2-benzothiazolyl)sulfenimide; N- cyclohexyl(6-methoxy-2-benzothiazolyl) sulfenimide; N-cyclohexyl-(7-methoxy-2-benzothiazolyl)sulfenimide; N-ethyl-(4-ethoxy-2-benzothiazolyl)sulfenimide; N-ethyl-(5-ethoxy-2-benzothiazolyl)sulfenimide; N-ethyl-(6-ethoxy-2-benzothiazolyl)sulfenimide; N-ethyl-(7-ethoxy-2-benzothiazolyl)sulfenimide; N-tert-butyl-(4-ethoxy-2-benzothiazolyl) sulfenimide; N- tert-butyl-(5-ethoxy-2-benzothiazolyl)sulfenimide; N-tert-butyl-(6-ethoxy-2-benzothiazolyl)sulfenimide; N-tert-butyl-(7-ethoxy-2-benzothiazolyl)-sulfenimide; N-cyclohexyl-(4-ethoxy-2-benzothiazolyl)sulfenimide; N-cyclohexyl-(5-ethoxy-2-benzothiazolyl)sulfenimide; N-cyclohexyl-(6-ethoxy-2-benzothiazolyl)sulfenimide; N-cyclohexyl-(7-ethoxy-2-benzothiazolyl)sulfenimide; N-ethyl-(4-butoxy-2-benzothiazolyl)sulfenimide; N-ethyl-(5-butoxy-2-benzothiazolyl)sulfenimide; N-ethyl-(6-butoxy-2-benzothiazolyl)sulfenimide; N-ethyl-(7-butoxy-2-benzothiazolyl)sulfenimide; N-tert-butyl-(4-butoxy-2-benzothiazolyl)sulfenimide; N-tert-butyl(5-butoxy-2-benzothiazolyl)sulfenimide; N-tert-butyl-(6-butoxy-2-benzothiazolyl)sulfenimide; N-tert-butyl-(7-butoxy-2-benzothiazolyl)sulfenimide; N-cyclohexyl-(4-butoxy-2-benzothiazolyl)sulfenimide; N-cyclohexyl-(5-butoxy-2-benzothiazolyl)sulfenimide; N-cyclohexyl-(6-butoxy-2-benzothiazolyl)sulfenimide; and N-cyclohexyl-(7-butoxy-2-benzothiazolyl)sulfenimide.

In the benzothiazole compound-based vulcanization accelerator represented by any of the general formulae (IV) (V) and (VI) to be used in the present invention, the alkoxy group contained in the compound is preferably in 4- or 6-position, more preferably in 4-position of a single aromatic ring. In more detail, the benzothiazole compound having the alkoxy group in 4-or 6-position of a single aromatic ring, is preferable from the aspect of easiness in the procurement of its raw materials and in the synthesis of the objective compound. In addition, benzothiazolylsulfenamide, benzothiazyl disulfide and benzothiazolylsulfenamide each having an alkoxy group in 4-or 6-position of a single aromatic ring, are preferable with regard to anti-scorching properties. Moreover, the benzothiazol compound having the alkoxy group in 4-position thereof is more preferable because of its function of suppressing the hardening of a rubber composition during its thermal aging.

The blending amount of the above-mentioned benzothiazole compound-based vulcanization accelerator to be used in the present invention is preferably 0.2 to 10, more preferably 0.5 to 5.0 parts by weight based on 100 parts by weight of the feedstock rubber. The blending amount, when being less than 0.5 part by weight based thereon, results in failure to attain sufficient working effect, whereas the blending amount, when being more than 10 parts by weight based thereon, results in failure to further enhance the working effect which corresponds to the blended amount, and besides deteriorates the workability such as anti-schorching properties.

The above-mentioned vulcanization accelerator to be used in the present invention may be optionally blended with a general-purpose vulcanization accelerator such as a thiazole-based vulcanization accelerator exemplified by 2-mercaptobenzothiazyl disulfide, N-tert-butyl-benzothiazolylsulfenamide and N-cyclohexylbenzothiazolylsulfenamide, and a thiuram-based vulcanization accelerator exemplified by tetra(2-ethylhexyl)-thiuram disulfide and tetramethylthiuram disulfide.

By blending the vulcanization accelerator represented by any of the general formulae (I) to (VI) in the rubber composition according to the present invention, it is made possible to suppress the hardening of rubber due to heat history by tire running and also to preserve the flexibility of the rubber. On the other hand, the effect of aluminum hydroxide on the maneuverability of a tire increases with an increase in the flexibility of the rubber.

The rubber composition according to the present invention may be blended as desired, with any of a variety of chemical agents that are usually employed in the field of rubber industries to the extent that the blending does not impair the objects of the present invention. Examples of the chemical agents include vulcanizing agents, vulcanization accelerators, antioxidants, scorch inhibitors, softening agents, other fillers, zinc oxide and stearic acid.

The rubber composition of the present invention thus obtained is used as a tire tread. The use of the rubber composition as a tire tread enables the tire not only to maintain favorable low fuel consumption properties and wear resistance, but also to be imparted with greatly improved gripping properties on wet road surfaces particularly at a low temperature.

The pneumatic tire according to the present invention can be produced by the use of the rubber composition of the present invention through a conventional method. Specifically, said pneumatic tire is produced by a method in which the rubber composition of the present invention is blended, when necessary, with the above-mentioned various chemical agents, the resultant blend is extruded into a tread member under unvulcanized condition, the tread member is stuck molded on a building machine through a conventional method to form an unvulcanized tire, and then the unvulcanized tire is vulcanized in a vulcanizing machine by heating and pressurizing to produce the objective pneumatic tire.

The pneumatic tire according to the present invention thus obtained is capable of not only maintaining favorable low fuel consumption properties and wear resistance, but also imparting greatly improved gripping properties on wet road surfaces particularly at a low temperature.

Moreover, the pneumatic tire which is made from the rubber composition according to the present invention, is capable of exerting the excellent effect of maintaining a high maneuverability from the initial stage of running to and after the middle stage thereof.

In the following, the present invention will be described in more detail with reference to comparative examples and working examples, which however shall never limit the present invention thereto.

The physical properties of vulcanized rubber were measured according to the under-mentioned methods.

(1) Wet skid performance (gripping properties on wet road surfaces

The wet skid performance of the vulcanized rubber was measured by the use of a British standard portable skid teser (manufactured by Stanley London Corp.), and was expressed by an index on the basis of Comparative Example 2 as the control of 100. The greater the index value, the better the wet skid performance.

(2) Rolling resistance

By the use of a spectrometer manufactured by Toyo Seiki Seisaku-Sho, Ltd., the hysteresis loss (tan δ) of the vulcanized rubber was measured under the conditions including a dynamic strain amplitude of 0.1%, a frequency of 52 Hz and a temperature of 60° C. Thus the reciprocal of the tan δ was expressed as the index of the rolling resistance thereof on the basis of Comparative Example 2 as the control of 100. The greater the index value, the better the rolling resistance.

(3) Wear resistance

By the use of a Lambourne type wear tester, the wear loss of the vulcanized rubber was measured under the conditions including room temperature and a slip ratio of 25%. Thus the reciprocal of the wear loss was expressed as the index of the wear resistance thereof on the basis of Comparative Example 2 as the control of 100. The greater the index value, the better the wear resistance.

(4) Maneuverability (wet maneuvering stability)

The maneuverability of a new unused tire was evaluated by running an FF four-door sedan fitted with the tire, on wet asphalt road in a proving ground through overall evaluations which were made by a test driver with regard to driving properties, braking properties, handle responding properties and controllability at the time of steering. Further, the maneuverability of the used tire was evaluated in the same manner as described above by subjecting the new tire to running on commercial road over a distance of 20,000 km in order to obtain a used tire.

The evaluation results of the new unused tires and used tires for each of Examples 1 and 2 and Comparative Examples 2, 3, 4, 5 and 6, and the used tire of Comparative Example 1, were compared with the evaluation results of the new unused tire for Comparative Example 1 as as a control. The difference in the evaluation results between a test tire and the control tire was expressed by numerals with ± (plus and/or minus). It means that the higher the +numeral, the better the maneuverability, and the higher the −numeral, the worse the maneuverability. The meanings of the symbols and the numerals are as follows:

+0; the difference in maneuvering performance from the control tire being undetectable even by the test driver +1; the test tire being superior to the extent that the difference in the performance therefrom is detectable in a significant level by the test driver +2; the test tire being superior to the extent that the difference in the performance therefrom is detectable in an evident level by the test driver +3; the test tire being superior to the extent that the difference in the performance therefrom is detectable in a remarkably evident level by the test driver +4; the test tire being superior to the extent that the difference in the performance therefrom is detectable in an evident level even by an ordinary driver In addition, the extents of inferiority expressed by −1, −2, −3 and −4, respectively are each obtained by replacing the wording of "being superior" with that of "being inferior" in each of the corresponding numerals from 1 to 4.

Examples 1 & 2 and Comparative Examples 1 to 3

Each of the components whose kinds and amounts are shown in Table 1 was blended with one another, the resultant blend was vulcanized at 150° C. for 30 minutes, and measurements were made of the physical properties of the vulcanized rubber. The results are given in Table 1.

TABLE 1

|  | Example | | Comp. Example | | |
| --- | --- | --- | --- | --- | --- |
|  | 1 | 2 | 1 | 2 | 3 |
| Blending Composition (parts by wt.) | | | | | |
| (A) Natural Rubber | 20 | 20 | 20 | 20 | 20 |
| (A) SBR #1500 | 80 | 80 | 80 | 80 | 80 |
| (B) Al(OH)$_3$ powders | 15 | 30 | — | — | 15 |
| (C) Silica powders | 20 | 20 | — | 30 | — |

TABLE 1-continued

|  | Example | | Comp. Example | | |
|---|---|---|---|---|---|
|  | 1 | 2 | 1 | 2 | 3 |
| (D) Carbon black | 25 | 25 | 60 | 30 | 45 |
| (E) Coupling agent | 3 | 3 | — | 4.5 | — |
| Aroma oil | 6 | 6 | 15 | 6 | 6 |
| Stearic acid | 2 | 2 | 2 | 2 | 2 |
| Zinc oxide | 3 | 3 | 3 | 3 | 3 |
| Sulfur | 2 | 2 | 2 | 2 | 2 |
| Vulcanization accelerator | 1.2 | 1.2 | 1.2 | 1.2 | 1.2 |
| Antioxidant | 1.0 | 1.0 | 1.0 | 1.0 | 1.0 |
| Physical Properties of Vulcanized Rubber | | | | | |
| Wet skid performance | 128 | 137 | 89 | 100 | 128 |
| Rolling resistance | 105 | 100 | 84 | 100 | 93 |
| Wear resistance | 102 | 100 | 100 | 100 | 97 |
| Wet maneuverability (new tire) | ☆ | +1 | −2 | −1 | −1 |

[Remarks]
☆: control
(1) SBR 1500: emulsion polymerized styrene-butadiene rubber, manufactured by by JSR Corporation
(2) Al(OH)$_3$ powders: manufacturced by Showa Denko, K.K., trade name "Higilite H-43M", average particle diameter of 0.6 μm
(3) Silica powder: manufactured by Nippon Silica Industrial Co., Ltd., trade name "Nipseal AQ", BET value of 195 m$^2$/g
(4) Carbon black: manufactured by Tokai Carbon Co., Ltd., trade name "Seast KH", BET value of 93 m$^2$/g
(5) Coupling agent: manufactured by Degussa AG, trade name "Si69", bis (3-triethoxysilylpropyl) tetrasulfide
(6) Vulcanization accelerator: diphenylguanidine
(7) Antioxidant: N-(1,3-dimethylbutyl)-N'-phenyl-p-phenylene-diamine

Examples 3 to 6 and Comparative Examples 4 to 9

The blending components for each of Examples 3 to 6 and Comparative Examples 4 to 9 as shown in Table 2, were further incorporated with the blending components which were common to each of the examples and comparative examples, and which were composed of 20 parts by weight of an aroma oil, 2.0 parts by weight of wax, 0.5 part by weight of 2, 2, 4-trimethyl-1, 2-dihydroquinoline polymer, 1.0 part by weight of N-isopropyl-N'-phenyl-p-phenylenediamine, 1.0 part by weight of stearic acid, 3.0 parts by weight of zinc oxide and 1.8 part by weight of sulfur. The resultant blend was vulcanized at 150° C. for 30 minutes. In addition by the use of said blend, a test tire sized 195/60R14 was prepared. Thus evaluations were made of the physical properties of the vulcanized rubber and of wet maneuverability of the test tire. In addition, the vulcanized rubber in Example 3 was used as the control for the evaluations of wet skid performance, rolling resistance and wear resistance, and the new unused tire in Example 3 was used as the control for the evaluations of wet maneuverability of the trial tires. The results are given in Table 2.

TABLE 2-1

|  | Example | | | |
|---|---|---|---|---|
|  | 3 | 4 | 5 | 6 |
| Blending Composition (parts by wt.) | | | | |
| SBR 1500 [1] | 60 | 60 | 60 | 60 |
| SBR 0120 [2] | 55 | 55 | 55 | 55 |
| Natural Rubber | — | — | — | — |
| Al(OH)$_3$ powders [3] | 25 | 25 | 25 | 25 |
| Silica powders [4] | 15 | 15 | 15 | 15 |
| Carbon black [5] | 30 | 30 | 30 | 30 |
| Coupling agent [6] | 2.3 | 2.3 | 2.3 | 2.3 |
| Vulcanization accelerator MBTS [7] | — | — | — | — |
| Vulcanization accelerator DPG [8] | 0.5 | 0.5 | 0.5 | 0.5 |
| Vulcanization accelerator MMBTS [9] | 1.0 | — | — | — |
| Vulcanization accelerator TBBS [10] | 0.5 | 0.5 | 0.5 | 0.5 |
| Vulcanization accelerator DIPDPZn [11] | — | 0.7 | — | — |
| Vulcanization accelerator DBDPZn [12] | — | — | 1.0 | — |
| Vulcanization accelerator EBTS [13] | — | — | — | 1.0 |
| Total styrene content [14] | 28.1 | 28.1 | 28.1 | 28.1 |
| Physical Properties of Vulcanized Rubber | | | | |
| Wet skid performance | 100☆ | 100 | 100 | 100 |
| Rolling resistance | 100☆ | 100 | 100 | 100 |
| Wear resistance | 100☆ | 100 | 100 | 100 |

TABLE 2-1-continued

|  | Example | | | |
|---|---|---|---|---|
|  | 3 | 4 | 5 | 6 |
| Tire Performance | | | | |
| Wet maneuverability (new tire) | ☆ | ±0 | ±0 | ±0 |
| Wet maneuverability (used tire) | −1 | −1 | −1 | −1 |

[Remarks]
☆: control

TABLE 2-2

|  | Comparative Example | | | | | |
|---|---|---|---|---|---|---|
|  | 4 | 5 | 6 | 7 | 8 | 9 |
| Blending Composition (parts by wt.) | | | | | | |
| SBR 1500 [1] | 60 | 60 | 60 | 60 | — | — |
| SBR 0120 [2] | 55 | 55 | 55 | 55 | 55 | 55 |
| Natural Rubber | — | — | — | — | 60 | 60 |
| Al(OH)$_3$ powders [3] | — | — | — | 25 | 25 | — |
| Silica powders [4] | 15 | 15 | 15 | 15 | — | 15 |
| Carbon black [5] | 65 | 65 | 65 | 65 | 50 | 50 |
| Coupling agent [6] | 2.3 | 2.3 | 2.3 | 2.3 | — | — |
| Vulcanization accelerator MBTS [7] | 0.5 | — | — | 0.5 | — | — |
| Vulcanization accelerator DPG [8] | 0.5 | 0.5 | 0.5 | 0.5 | 0.5 | 0.5 |
| Vulcanization accelerator MMBTS [9] | — | 1.0 | — | — | — | — |
| Vulcanization accelerator TBBS [10] | 0.5 | 0.5 | 0.5 | 0.5 | 0.5 | 0.5 |
| Vulcanization accelerator DIPDPZn [11] | — | 0.7 | 0.7 | 0.7 | 0.7 | 0.7 |
| Total styrene content [12] | 28.1 | 28.1 | 28.1 | 28.1 | 14 | 14 |
| Physical Properties of Vulcanized Rubber | | | | | | |
| Wet skid performance | 85 | 85 | 85 | 95 | 70 | 70 |
| Rolling resistance | 80 | 80 | 80 | 75 | 125 | 120 |
| Wear resistance | 105 | 105 | 105 | 100 | 130 | 140 |
| Tire Performance | | | | | | |
| Wet maneuverability (new tire) | −1 | −1 | −1 | ±0 | −2 | −2 |
| Wet maneuverability (running tire) | −4 | −3 | −3 | −1 | −3 | −3 |

The symbols in Table 2 are detailed as follows:
[1] SBR 1500: styrene content of 23.5% by weight, manufactured by SR Corporation
[2] SBR 0120: styrene content of 35% by weight, extending oil of 37.5 parts by weight, manufactured by JSR Corporation
[3] Al(OH)$_3$ powders: manufactured by Showa Denko, K.K., trade name "Higilite H-43M", average particle diameter of 0.6 μm
[4] Silica powder: manufactured by Nippon Silica Industrial Co., Ltd., trade name "Nipseal AQ", BET value of 195 m$^2$/g
[5] Carbon black: manufactured by Tokai Carbon Co., Ltd. trade name "Seast KH", BET value of 93 m$^2$/g
[6] Coupling agent: manufactured by Degussa AG, trade name "Si69", bis (3-triethoxysilylpropyl) tetrasulfide
[7] MBTS: bis(benzothiazolyl-2) disulfide
[8] DPG: diphenylguadinine
[9] MMBTS: bis(4-methylbenzothiazolyl-2) disulfide
[10] TBBS: N-tert-butyl-2-benzothiazolylsulfenamide
[11] DIPDPZn: zinc O,O'-diisopropyl dithiophosphate
[12] DBDPZn: zinc O,O'-n-butyl dithiophosphate
[13] EBTS: di-4-ethoxy-2-benzothiazyl disulfide
[14] Total styrene content: % by weight in the total rubber component.

It is understood from Table 1 that the pneumatic tire according to the present invention can maintain favorable maneuverability from the initial stage to and after the middle stage of running.

It can be seen from the results of the examples and comparative examples that the maneuverability of the tire is deteriorated in and after the middle stage of running in any of the cases including the case where use is not made of the aluminum hydroxide according to the present invention nor the vulcanization accelerator according to the present invention (Comparative Example 4); the case where use is not made of said aluminum hydroxide but use is made only of the benzothiazole-based vulcanization accelerator according to the present invention (Comparative Example 5); the case where use is not made of said aluminum hydroxide but use is made only of the dithiophosphoric acid-based vulcanization accelerator according to the present invention (Comparative Example 6); the case where use is not made of any of the vulcanization accelerators according to the present invention but use is made only of said aluminum hydroxide (Comparative Example 7); and the case where use is made of the dithiophosphoric acid-based vulcanization accelerator according to the present invention, but the total content of styrene from SBR in the total rubber component is outside the specific range in the present invention (less than 20% by weight) irrespective of the use or nonuse of the aforesaid aluminum hydroxide (Comparative Examples 8 and 9). On the one hand, it is understood that maneuverability of the tire is maintained at a high level from the initial stage to and after the middle stage of running, in the case where use is made of the aluminum hydroxide in combination with the vulcanization accelerator each according to the present invention, and the total content of styrene from SBR in the total rubber component is within the specific range in the present invention, that is, more than 20% by weight of the total rubber component (Examples 3 and 4).

What is claimed is:

1. A rubber composition for a tire tread which comprises (A) a rubber component comprising a diene-based synthetic rubber or a mixture of a diene-based synthetic rubber and natural rubber, and containing at least 20% by weight of a styrene-butadiene rubber;

5 to 50 parts by weight of (B) aluminum hydroxide powder based on 100 parts by weight of rubber component (A);

at least 5 parts by weight of (C) silica powder based on 100 parts by weight of rubber component (A); and 1 to 70 parts by weight of (D) carbon black based on 100 parts by weight of rubber component (A), wherein the total amount of the components (B) and (C) is in the range of 40 to 80 parts by weight based on 100 parts by weight of rubber component (A) and the total amount of the components (B), (C) and (D) is in the range of 40 to 80 parts by weight based on 100 parts by weight of rubber component (A).

2. The rubber composition for a tire tread according to claim 1, wherein the aluminum hydroxide powders (B) have an average particle diameter of at most 10 μm.

3. The rubber composition for a tire tread according to claim 1, wherein said composition further comprises (E) a coupling agent.

4. The rubber composition for a tire tread according to claim 3, wherein the coupling agent (E) is a silane-based coupling agent.

5. The rubber composition for a tire tread according to claim 1, wherein said composition further comprises 0.2 to 10.0 parts by weight of (F) a vulcanization accelerator based on 100 parts by weight of rubber component (A), wherein said vulcanization accelerator (F) is selected from the group consisting of a dithiophosphoric acid compound-based vulcanization accelerator and a benzothiazole compound-based vulcanization accelerator.

6. The rubber composition for a tire tread according to claim 1, wherein the total content of styrene from the styrene butadiene rubber is at least 20% by weight based on the total rubber component (A).

7. The rubber composition for a tire tread according to claim 5, wherein the dithiophosphoric acid compound-based vulcanization accelerator is at least one member selected from the group consisting of a metallic salt of dithiophosphoric acid represented by the general formula (I), O, O'-dialkyl dithiophosphate disulfide and O, O'-dialkyl dithiophosphate tetrasulfide;

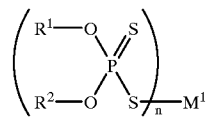
(I)

wherein $R^1$ and $R^2$ are independently of one another, an alkyl group which may be any of straight chain and branched chain and which has 1 to 8 carbon atoms, a cycloalkyl group having 3 to 10 carbon atoms, or an aryl group having 6 to 10 carbon atoms; $M^1$ is a metal atom selected from the group consisting of Zn atom, Sb atom, Fe atom and Cu atom; and n is the number of valency of the metal bonded.

8. The rubber composition for a tire tread according to claim 7, wherein the metallic salt of dithiophosphoric acid is represented by the general formula (II)-(1) or (II)-(2)

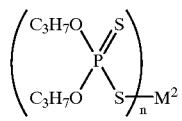
(II)-(1)

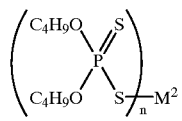
(II)-(2)

wherein $M^2$ is a metal atom selected from the group consisting of Zn atom and Sb atom; and n is the number of valency of the metal bonded.

9. The rubber composition for a tire tread according to claim 5, wherein the benzothiazole compound-based vulcanization accelerator is at least one member selected from the group consisting of the compounds represented by the general formulae (III), (IV), (V) and (VI), respectively;

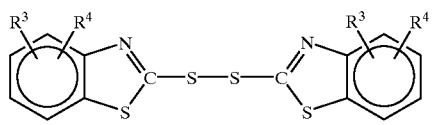
(III) - (1)

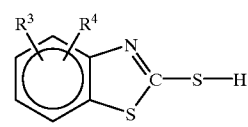
(III) - (2)

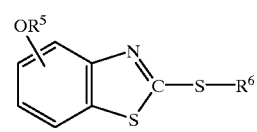
(IV)

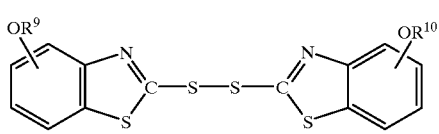
(V)

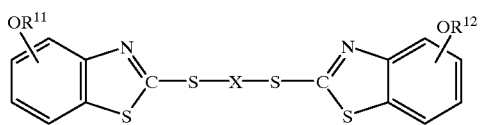 (VI)

wherein R³ and R⁴ are independently of one another, a hydrogen atom, an alkyl group having 1 to 8 carbon atoms or an aryl group having 6 to 10 carbon atoms with the proviso that R³ and R⁴ are not simultaneously a hydrogen atom; R⁵ is an alkyl group having 1 to 8 carbon atoms, an alkenyl group having 2 to 8 carbon atoms or a cycloalkyl group having 3 to 8 carbon atoms; R⁶ is a hydrogen atom or an amino group represented by —N(R⁷)R⁸ wherein R⁷ and R⁸ are independently of one another, a hydrogen atom, an alkyl group having 2 to 4 carbon atoms or a cyclohexyl group with the proviso that R⁷ and R⁸ are not simultaneously a hydrogen atom; R⁹ and R¹⁰ are independently of one another, an alkyl group having 1 to 8 carbon atoms, an alkenyl group having 2 to 8 carbon atoms or a cycloalkyl group having 3 to 8 carbon atoms; X is Zn atom, Cu atom or an amino group represented by >N—R¹³ wherein R¹³ is an alkyl group having 2 to 4 carbon atoms or a cyclohexyl group; and R¹¹ and R¹² are each the same as R⁹.

10. A pneumatic tire having a tread which comprises the rubber composition as set forth in any one of claims 1 to 9.

* * * * *